(12) United States Patent
Colombo et al.

(10) Patent No.: US 7,367,087 B2
(45) Date of Patent: May 6, 2008

(54) ENGRAVING AND MARKING DEVICE PARTICULARLY FOR MACHINE TOOLS AND THE LIKE

(75) Inventors: Christian Colombo, Milan (IT); Alessandro Pirovano, Barasso (IT)

(73) Assignee: FICEP, Ltd., Dublin (IE)

( * ) Notice: Subject to any disclaimer, the term of this patent is extended or adjusted under 35 U.S.C. 154(b) by 168 days.

(21) Appl. No.: 11/436,987

(22) Filed: May 18, 2006

(65) Prior Publication Data
US 2006/0289758 A1 Dec. 28, 2006

(30) Foreign Application Priority Data
May 19, 2005 (IT) .......................... MI2005A0911

(51) Int. Cl.
*B23B 49/00* (2006.01)
*B23C 9/00* (2006.01)

(52) U.S. Cl. ........................ D18/57; D18/56; 408/146; 408/239 R; 408/11; 408/12; 408/13; 33/21.4

(58) Field of Classification Search ..................... None
See application file for complete search history.

(56) References Cited

U.S. PATENT DOCUMENTS

| | | | |
|---|---|---|---|
| 1,562,237 A | * | 11/1925 | Horner ........................ 409/186 |
| 2,744,329 A | | 5/1956 | Way et al. |
| 2,810,960 A | | 10/1957 | Johnson et al. |
| 3,384,965 A | | 5/1968 | Sicking |
| 4,778,313 A | | 10/1988 | Lehmkul et al. |
| 2003/0039524 A1 | | 2/2003 | Pentz et al. |
| 2004/0060180 A1 | | 4/2004 | Nelson |

* cited by examiner

*Primary Examiner*—Nikita Wells
(74) *Attorney, Agent, or Firm*—R. Neil Sudol; Henry D. Coleman; William J. Sapone

(57) ABSTRACT

An engraving and marking device, usable in machine tools and the like, includes a supporting member provided with a coupling which is engaged by a spindle of a machine tool and supports a toolbit by means of an elastic support. The device is adapted to engrave and mark a piece being machined in a fully automatic manner.

10 Claims, 2 Drawing Sheets

Ized Patent
ENGRAVING AND MARKING DEVICE PARTICULARLY FOR MACHINE TOOLS AND THE LIKE

CROSS-REFERENCE TO RELATED APPLICATIONS

This application claims the priority of Italian Patent Application No. MI2005A000911, filed on 19 May 2005, the subject matter of which is incorporated herein by reference.

BACKGROUND OF THE INVENTION

1. Field of the Invention

The present invention relates to an engraving and marking device particularly for machine tools and the like.

2. Description of the Prior Art

Various machines, such as for example punching machines, perforating machines, sawing machines, shears and others, are known which are used to machine at preset positions elongated, bodies such as beams, corner members, profiled members, tubular members, flat members and the like.

In particular, these machines are provided with devices suitable to feed or convey longitudinally the elongated bodies toward the position for machining, which is to be performed precisely at specific points of the bodies.

For this purpose, the conveyance devices are provided with a means which performs the function of measuring the stroke or the length of the conveyance of the elongated body at the end of which it is necessary to perform the intended machining.

Once all the required machining operations have been performed, the part is ready for marking, which is traditionally performed by hand.

Marking consists in providing markings and any other indication required for the subsequent installation of the part.

Machines are commercially available which are capable of performing certain limited engraving operations on the piece, such as marking machines, which are capable of stamping, for example, a code on a beam. However, a single marking machine is unable to engrave both on the web and on the legs of the beam and therefore cannot be used to perform complete marking operations.

Automatic devices are also known which are capable of producing point-by-point markings on pieces, but even these devices offer a very limited range of possibilities and cannot completely replace traditional manual marking, US2004/0060180-A1 discloses a spring-loaded engraving tool-holder held in an endmill toolholder and placed into the spindle of a standard numerical control milling type machine.

The toolholder disclosed by US2004/0060180-A1 is able to produce a consistent mark even if the surface of the material is uneven or not parallel to the plane of motion of the machine.

However, if the hardness of the material varies in different locations on the surface, as may happen in some instances, namely on metal beams, girders or struts, the mark produced by such device will not be consistent because in the softer areas the toolbit is driven deeper into the softer surface.

The aim of the present invention is to provide a device that can be used in machine tools, for marking or engraving the piece being machined, which overcomes the prior art inconveniences.

An object of the invention is to provide a device that allows to engrave or draw in any portion of the piece with consistency.

A further object of the invention is to provide a device that can be used in any type of machine tool.

A further object is to provide a device that is capable of engraving and marking on any type of material.

SUMMARY OF THE INVENTION

The above aims, and other aims that will become apparent to those skilled in the art, are achieved by an engraving and marking device, particularly for machine tools and the like, comprising a supporting member provided with a coupling which is engaged by a spindle of a machine tool, said supporting member supporting a toolbit by means of an elastic supporting means, characterized in that said supporting member has an end abutting a surface to be worked by said toolbit, said abutting end being adjustable in order to set a selected distance between said abutting end and the working tip of said toolbit.

Further characteristics and advantages of the invention will become apparent from a reading of the detailed description of a preferred but not exclusive embodiment of a device according to the invention, illustrated only by way of a non-limiting example in the accompanying drawings.

DESCRIPTION OF THE PREFERRED EMBODIMENTS OF THE INVENTION

Figure 1:
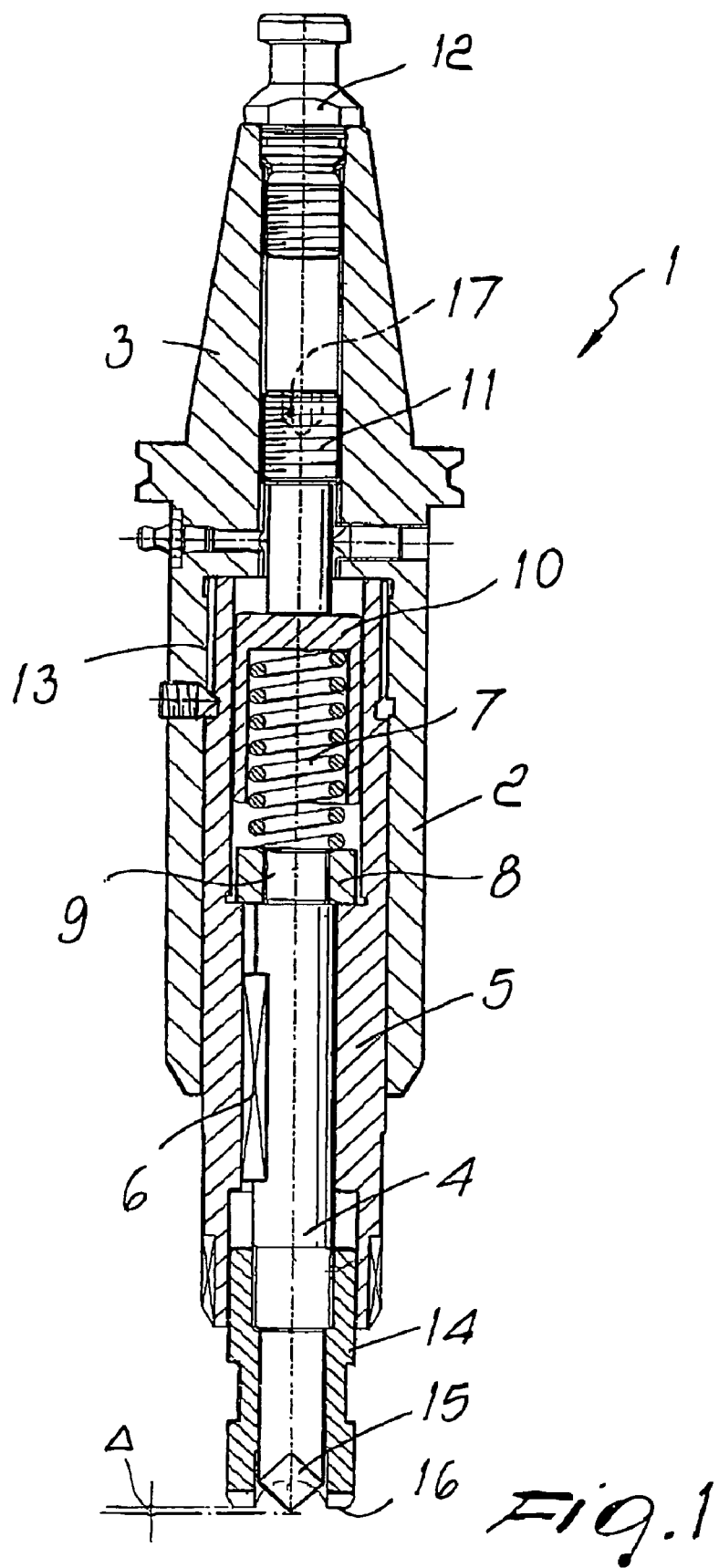
FIG. 1 is a longitudinal sectional view of the device according to the invention.
Figure 2:
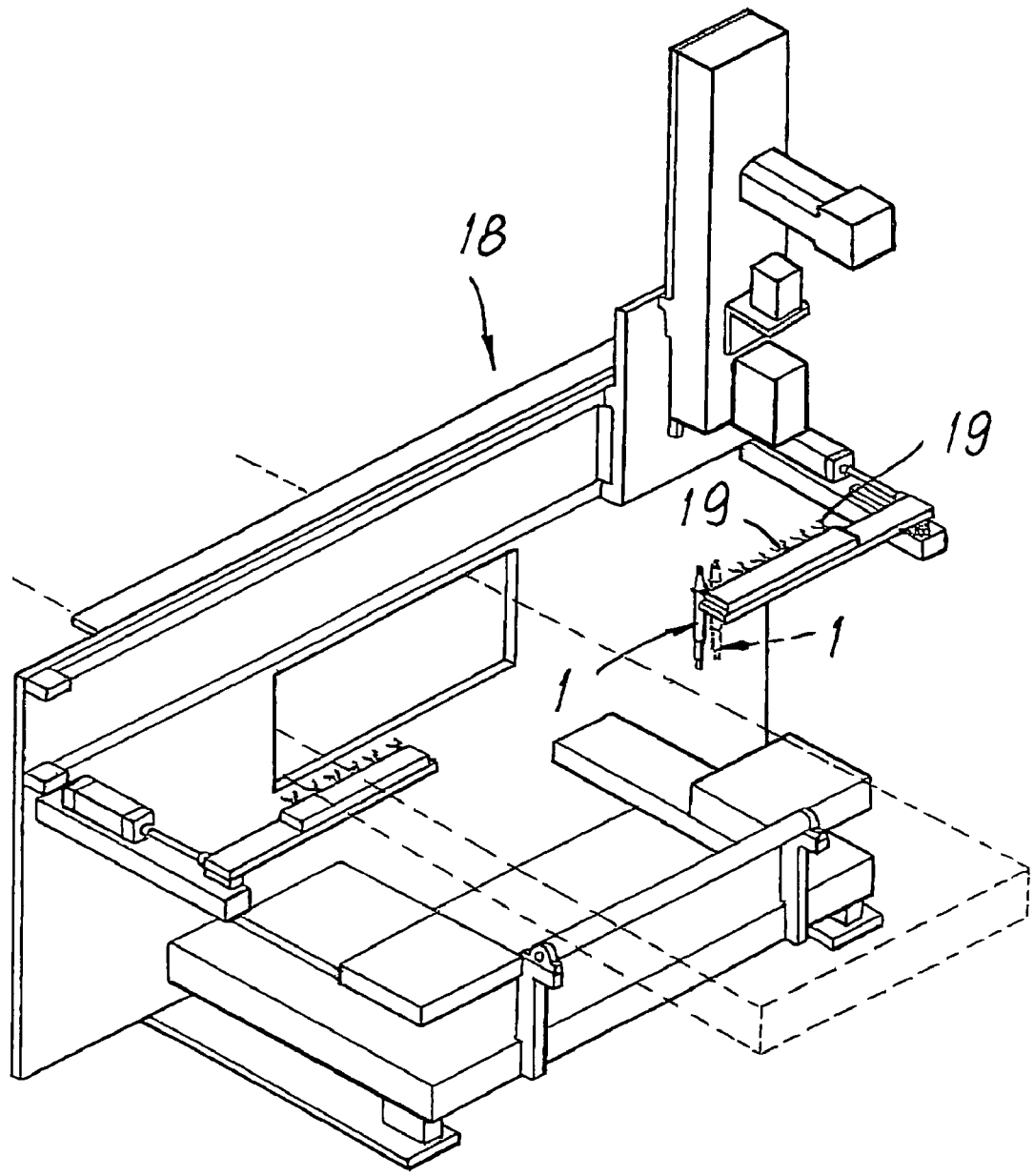
FIG. 2 is a schematic perspective view of a machine provided with the device according to the invention.

With reference to the figures, a device according to the invention, generally designated by the reference numeral 1, includes a standardized member 12, a cylindrical body 2 provided with a shank 3, of a standardized type and suitable to accommodate a toolbit 4 by means of an elastic supporting means.

The elastic supporting means includes an internal cylindrical body 5, which accommodates the toolbit 4 by means of a coupling provided with a key 6, so that the toolbit 4 can move axially within the internal cylindrical body 5 without being able to rotate.

The internal body 5 is screwed into the cylindrical body 2 by a thread 13.

The toolbit 4 can move axially within the internal cylindrical body 5 in contrast with an elastic member, namely a helical spring 7.

One end of the helical spring 7 is inserted in a threaded spring guiding ring 8, which is screwed onto a threaded shank 9 of the toolbit 4, and the other end is inserted in a spring guiding bush 10, which can slide within the internal body 5.

The spring guiding bush 10 abuts against the end of a threaded bar 11, which is screwed into the shank 3 of the device and has a recessed hexagonal key portion 17 which can rotate in order to adjust the preloading of the spring 7.

The device also comprises a cap 14, which is screwed onto the head of the toolbit 4 so as to fix the distance between the end 16 of the cap 14 and the working tip 15 of the toolbit 4. This determines the machining depth of the toolbit.

The device 1 according to the invention can be used in a machine tool 18 as a standard tool located in the tool holder 19 in order to be picked up by the head, in a per se known manner.

The tool according to the present invention is capable of engraving on any piece and in any position thereon, controlled by the program of the machine, on the basis of the drawing, as occurs for any other machining operation.

The presence of the adjustable elastic means interposed between the engraving toolbit and the coupling allows to adapt the device to surfaces and materials of different hardness in order to always obtain optimum marking on the piece.

The presence of the cap allows to easily and precisely set the intended engraving depth.

In fact, if the toolbit encounters a softer region of the surface of the piece to be machined the tip 14 of the toolbit will not be driven deeper into such softer region because of the end 16 of the cap abutting against such surface.

Pieces such as beams, girders and the like have regions of different hardness due to their manufacturing processes.

Because of the presence of the abutting end 16, the pre-load adjustment of the spring 7 is far less critical and therefore extremely simpler than, for example, the adjustment of the preload of the spring in devices such as the one disclosed in US2004/0060180-A1, that do not have an abutting end.

In practice it has been found that the invention achieves the intended aim and objects, a device being provided which allows to engrave and mark a part by means of a machine tool in a fully automatic manner as occurs with the other machining operations.

A characteristic of the present invention is that the device is engaged by the spindle that performs conventional machining operations, such as drilling, milling, threading, et cetera, and also performs the engraving/marking function.

Having thus described one particular embodiment of the invention, various alterations, modifications, and improvements will readily occur to those skilled in the art. Such alterations, modifications, and improvements as are made obvious by this disclosure are intended to be part of this disclosure though not expressly stated herein, and are intended to be within the spirit and scope of the invention.

Accordingly, the foregoing description is by way of example only and is not intended as limiting. The invention is limited only as defined in the following claims and the equivalents thereto.

What is claimed is:

1. An engraving and marking device, particularly for machine tools and the like, comprising a supporting member provided with a coupling which is engaged by a spindle of a machine tool, said supporting member supporting a toolbit by means of an elastic supporting means, said supporting member has an end abutting a surface to be worked by said toolbit, said abutting end being adjustable in order to set a selected distance between said abutting end and the working tip of said toolbit.

2. The device according to claim 1, wherein said supporting member comprises an external cylindrical body provided with a standardized shank.

3. The device according to claim 2, wherein said elastic supporting means comprises an internal cylindrical body, which is inserted within said external cylindrical body and accommodates said toolbit so that said toolbit can move axially within said internal cylindrical body without being able to rotate with respect to it.

4. The device according to claim 3, wherein it comprises a cap which is associated at an end of said internal cylindrical body and forms said abutting end setting said distance between said end and the working tip of said toolbit.

5. The device according to claim 3, wherein said internal body is screwed into said external cylindrical body.

6. The device according to claim 5, wherein said toolbit can move axially within said internal cylindrical body in contrast with an elastic member.

7. The device according to claim 6, wherein said elastic member is constituted by a helical spring.

8. The device according to claim 7, wherein said helical spring has one end inserted in a threaded spring guiding ring, which is screwed onto a threaded shank of said toolbit.

9. The device according to claim 8, wherein the other end of said helical spring is inserted in a spring guiding bush, which can slide within said internal cylindrical body.

10. The device according to claim 9, wherein said spring guiding bush abuts against the end of a threaded bar, which is screwed into said shank of the device and has a recessed hexagonal key portion, which can rotate in order to adjust the preloading of said elastic member.

* * * * *